(12) United States Patent
Chang et al.

(10) Patent No.: US 9,211,575 B2
(45) Date of Patent: Dec. 15, 2015

(54) METHOD OF MANUFACTURING ROLL FOR ROLL PRINTING/ROLL IMPRINTING

(75) Inventors: Sung Hwan Chang, Daejeon (KR); Jae Gu Kim, Daejeon (KR); Jae-Sung Yoon, Daejeon (KR); Yeong-Eun Yoo, Daejeon (KR); Doo-Sun Choi, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 45 days.

(21) Appl. No.: 13/703,396

(22) PCT Filed: Dec. 9, 2011

(86) PCT No.: PCT/KR2011/009522
§ 371 (c)(1),
(2), (4) Date: Dec. 11, 2012

(87) PCT Pub. No.: WO2012/078009
PCT Pub. Date: Jun. 14, 2012

(65) Prior Publication Data
US 2013/0263453 A1     Oct. 10, 2013

(30) Foreign Application Priority Data

Dec. 9, 2010 (KR) .................. 10-2010-0125884

(51) Int. Cl.
| | |
|---|---|
| *B21B 27/00* | (2006.01) |
| *B29C 33/42* | (2006.01) |
| *B29C 41/36* | (2006.01) |
| *B29C 53/04* | (2006.01) |

(52) U.S. Cl.
CPC ............ *B21B 27/005* (2013.01); *B29C 33/424* (2013.01); *B29C 41/36* (2013.01); *B29C 53/04* (2013.01); *Y10T 29/49549* (2015.01)

(58) Field of Classification Search
CPC   B21B 27/005; B29C 33/424; B29C 33/3807; B29C 45/372; B29C 45/0013; B29C 41/003; B29C 41/12; B29C 41/36; B29C 2059/023; B29C 2045/0015; B29C 67/001; B29C 70/88; B29C 70/887; B05D 5/00; B05D 5/02; B05D 5/12
USPC .................. 29/895, 895.21, 895.211, 895.23, 29/895.3, 895.31, 527.2; 492/8, 18, 45, 48
See application file for complete search history.

(56) References Cited

U.S. PATENT DOCUMENTS

| | | | |
|---|---|---|---|
| 3,217,641 A | 11/1965 | Goffredo | |
| 3,670,646 A | 6/1972 | Welch, Jr. | |
| 4,028,786 A * | 6/1977 | Dempster | ................... 492/8 |

(Continued)

FOREIGN PATENT DOCUMENTS

| | | |
|---|---|---|
| EP | 0739406 | 4/2000 |
| JP | 51-020076 | 2/1976 |

(Continued)

*Primary Examiner* — Jason L Vaughan
(74) *Attorney, Agent, or Firm* — Lex IP Meister, PLLC

(57) ABSTRACT

A method of manufacturing a roll for roll printing/roll imprinting is provided. The method includes preparing an exterior on one surface of which a printed pattern of a predetermined shape is formed and that has magnetic power and having the other surface of the exterior contact an external surface of a central roll so that the exterior is attached to the central roll having magnetic power by magnetic power. Therefore, the method of manufacturing a roll for roll printing/roll imprinting capable of reducing production cost to massively manufacture the roll for roll printing/roll imprinting is provided.

8 Claims, 7 Drawing Sheets

(56) References Cited

U.S. PATENT DOCUMENTS

| | | | |
|---|---|---|---|
| 4,078,031 A | 3/1978 | Bishop | |
| 5,653,924 A * | 8/1997 | Ishibashi et al. | 264/86 |
| 5,747,431 A | 5/1998 | Taylour et al. | |
| 6,479,578 B2 * | 11/2002 | Araki et al. | 524/517 |
| 2004/0016353 A1 | 1/2004 | Wegter | |
| 2007/0271791 A1 * | 11/2007 | Lai et al. | 29/895 |
| 2008/0054533 A1 * | 3/2008 | Kim | 264/478 |
| 2011/0201241 A1 | 8/2011 | Rubino | |

FOREIGN PATENT DOCUMENTS

| | | |
|---|---|---|
| JP | 05-026370 | 4/1993 |
| JP | 2006-018061 | 1/2006 |
| JP | 4792323 | 10/2007 |
| JP | 2007-313894 | 12/2007 |
| JP | 2007-335647 | 12/2007 |
| JP | 2008-229869 | 10/2008 |
| JP | 2008-290330 | 12/2008 |
| JP | 4521479 | 5/2010 |
| JP | 2010-177457 | 8/2010 |
| KR | 10-0784826 | 12/2007 |
| KR | 10-2008-0051922 | 6/2008 |
| KR | 10-0851068 | 8/2008 |
| KR | 10-2009-0126088 | 12/2009 |
| KR | 10-2010-0036484 | 4/2010 |
| KR | 20-2010-0011462 | 11/2010 |
| WO | 2010/041121 | 4/2010 |

* cited by examiner

METHOD OF MANUFACTURING ROLL FOR ROLL PRINTING/ROLL IMPRINTING

CROSS-REFERENCE TO RELATED APPLICATION

This application is a National Stage application of PCT/KR2011/009522 filed on Dec. 9, 2011, which claims priority to and the benefit of Korean Patent Application No. 10-2010-0125884 in the Korean Intellectual Property Office on Dec. 9, 2010, the entire contents of which are incorporated herein by reference.

BACKGROUND OF THE INVENTION (a) Field of the Invention

The present invention relates to a method of manufacturing a roll for roll printing/roll imprinting. More particularly, the present invention relates to a method of manufacturing a roll for roll printing/roll imprinting capable of reducing manufacturing cost and time.

(b) Description of the Related Art

As electronic and display industry related parts are downsized and have thin plates, it is required to improve the performance of precise micro pattern manufacturing processes and, in parts manufacturing equipment, preciseness, high productivity, and cost reduction effort are essential elements.

A producing system capable of manufacturing electronic element products and optical parts of several tens nm to several hundreds μm on a substrate formed of a flexible material using a printing process or an imprinting process is remarkably spotlighted. Particularly, in order to induce cost reduction and mass production, roll printing equipment or roll imprinting equipment such as roll-to-roll or roll-to-plate is widely used.

In the roll printing equipment and the roll imprinting equipment, a roll corresponds to a core constituent element.

FIG. 1 illustrates an example of a method of manufacturing a conventional roll for roll printing/roll imprinting. Referring to FIG. 1, in a conventional roll 10 for roll printing/roll imprinting equipment, the external surface of a cylinder formed of resin or metal material is manufactured using an additional processing machine such as a laser 11. In the method of manufacturing a roll for roll printing/roll imprinting, since the curved external surface of roll-shaped resin must be directly processed, machinability is deteriorated and there are limitations on securing a high quality pattern shape on the external circumferential surface of the roll for roll printing/roll imprinting.

In addition, the entire roll must be replaced when there is something wrong with the pattern of the external circumferential surface of the conventional roll for roll printing/roll imprinting.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of manufacturing a roll for roll printing/roll imprinting having advantages of reducing manufacturing cost and time. An exemplary embodiment of the present invention provides a method of manufacturing a roll for roll printing/roll imprinting.

Therefore, an object of the present invention is to provide a method of manufacturing a roll for roll printing/roll imprinting capable of additionally molding an exterior to be combined with a roll so that it is possible to reduce cost and time.

In order to achieve the object, there is provided a method of manufacturing a roll for roll printing/roll imprinting, including preparing an exterior on one surface of which a printed pattern of a predetermined shape is formed and that has magnetic power and having the other surface of the exterior contact an external surface of a central roll so that the exterior is attached to the central roll having magnetic power by magnetic power.

In addition, preparing the exterior may include manufacturing a substrate in which a mirror-shaped pattern of the pattern is formed and molding the exterior using the substrate as a mold.

In addition, molding the exterior may include preparing a mixture including ferromagnetic particles and polymer resin, filling the mixture in the substrate, hardening the filled mixture to form the exterior, and releasing the exterior from the substrate.

In addition, after hardening the filled mixture, a ferromagnetic additive may be further included in the mixture so that at least one of characteristics such as strength, electric conductivity, and thermal conductivity is improved.

In addition, the additive may be at least one of carbon nanotube, carbon fiber, and glass fiber.

In addition, the mixture may be disposed so that the ferromagnetic particles are moved to the direction of gravitation by self-gravitation.

A magnetic power member may be disposed on an opposite side to a side on which the pattern of the mixture is formed so that the ferromagnetic particles are moved by magnetic power.

In addition, the polymer resin may be flexible material.

In addition, the polymer resin may be at least one of polydimethylsiloxane (PDMS) and polytetrafluroethylene (PTFE).

In the method of manufacturing a roll for roll printing/roll imprinting according to the present invention, it is possible to reduce cost and time.

In addition, ferromagnetic particles are controlled to be dense on one side of an exterior combined with a central roll so that it is possible to realize improved binding power only by a small amount of ferromagnetic particles.

In addition, since the pattern is formed on the side of the exterior where the density of the ferromagnetic particles is low, it is possible to form a minute nano/micro pattern.

In addition, when there is something wrong with the pattern formed on the external circumferential surface, only the exterior is replaced. Therefore, it is possible to reduce maintaining and repairing cost.

DETAILED DESCRIPTION OF THE EMBODIMENTS

Figure 1:
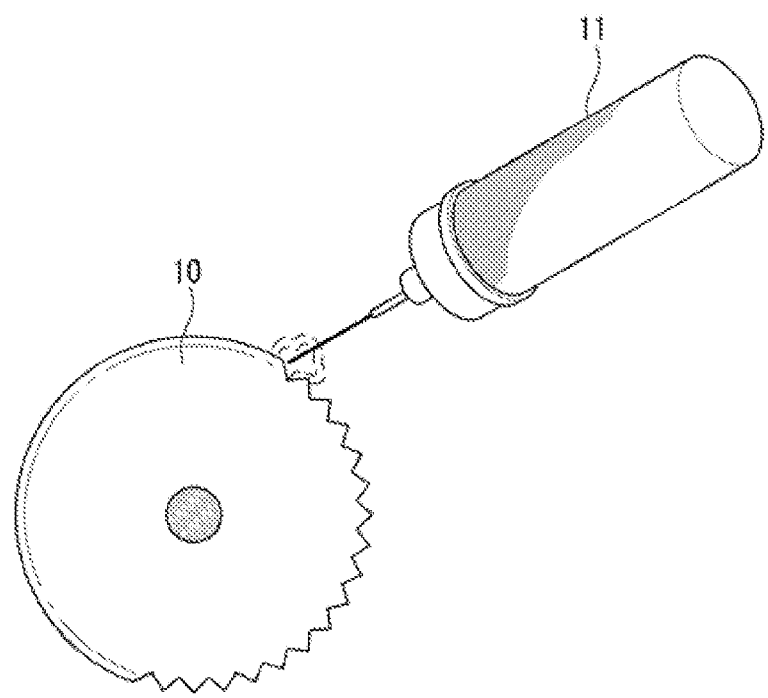
FIG. 1 illustrates an example of a method of manufacturing a conventional roll for roll printing/roll imprinting.

Before description, in various exemplary embodiments, like reference numerals designate like constituent elements in a first exemplary embodiment and different constituent elements from the constituent elements of the first exemplary embodiment will be described in the other exemplary embodiments.

Hereinafter, a roll printing/roll imprinting roll manufacturing method S100 according to the first exemplary embodiment of the present invention will be described with reference to the accompanying drawings.

Figure 2:
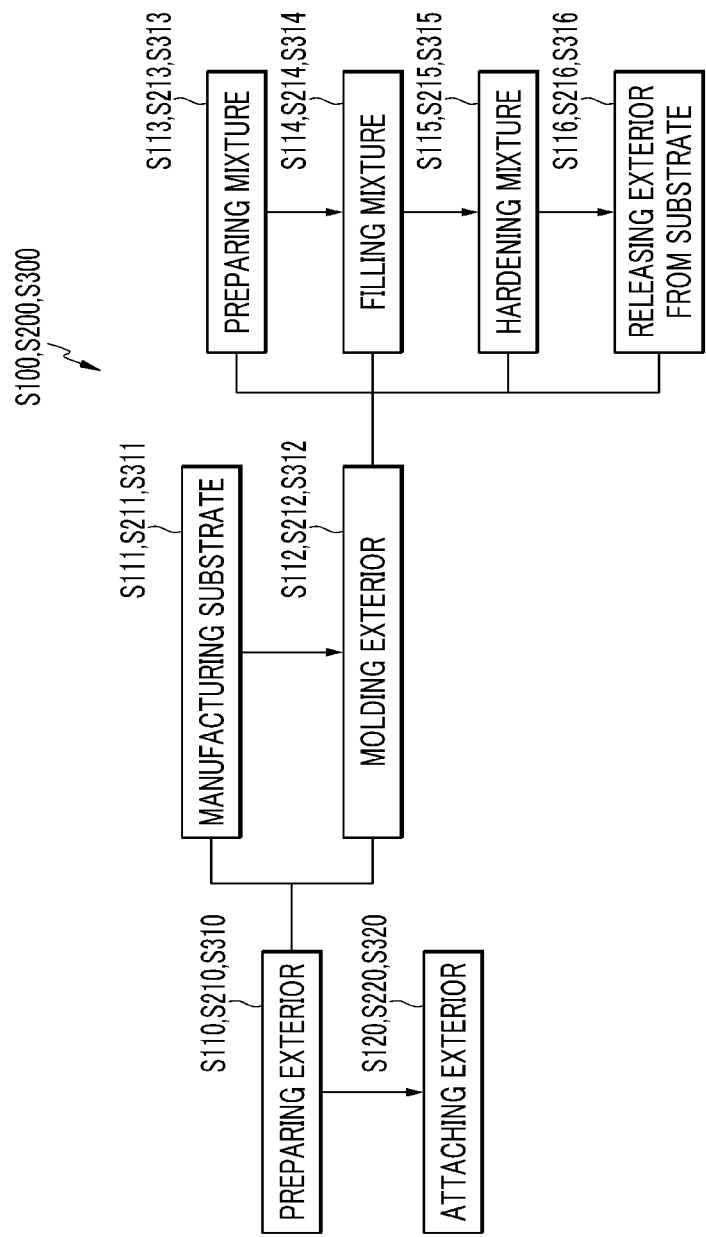
FIG. 2 is a process flowchart of methods of manufacturing a roll for roll printing/roll imprinting according to first to third exemplary embodiments of the present invention, FIG. 3 schematically illustrates the method of manufacturing a roll for roll printing/roll imprinting of FIG. 2, FIG. 4 schematically illustrates a modification of the filling step of FIG. 2, FIG. 5 schematically illustrates another modification of the filling step of FIG. 2, FIG. 6 schematically illustrates an exterior molding step in the method of manufacturing a roll for roll printing/roll imprinting according to the second exemplary embodiment of the present invention, FIG. 7 schematically illustrates an exterior molding step in the method of manufacturing a roll for printing according to the third exemplary embodiment of the present invention.
Figure 3:
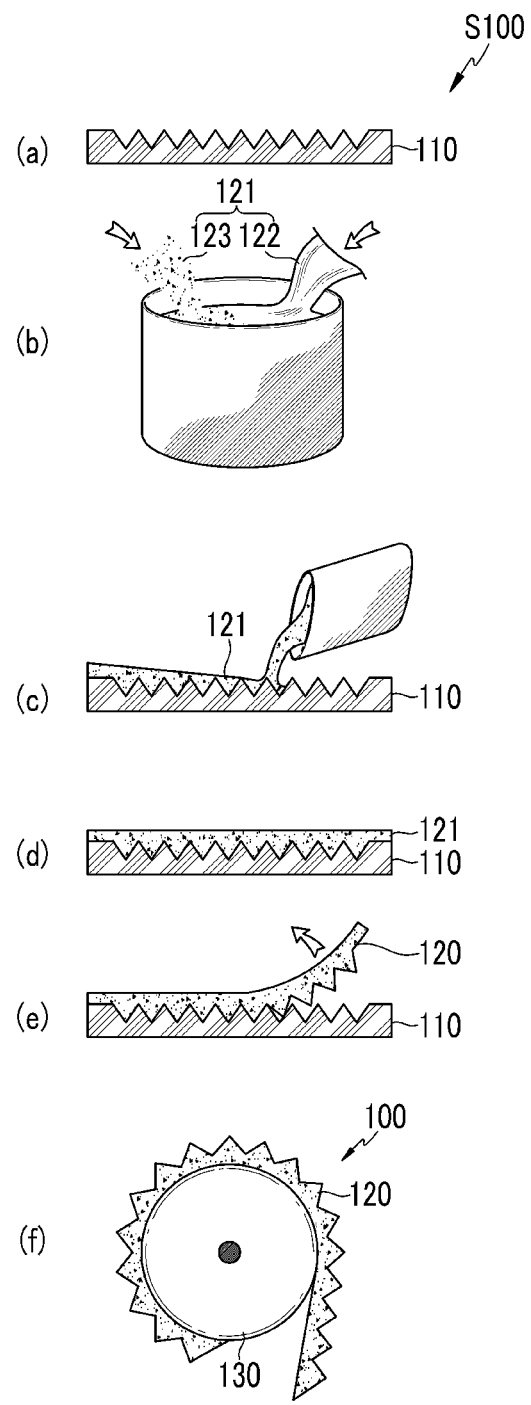

FIG. 2 is a process flowchart of a method of manufacturing a roll for roll printing/roll imprinting according to a first exemplary embodiment of the present invention and FIG. 3 schematically illustrates the method of manufacturing a roll for roll printing/roll imprinting of FIG. 2.

Referring to FIGS. 2 and 3, the roll printing/roll imprinting roll manufacturing method S100 according to the first exemplary embodiment of the present invention includes an exterior preparing step S110 and an exterior attaching step 120.

In the exterior preparing step S110, an exterior 120 that directly contacts an object during roll printing/roll imprinting is manufactured. The exterior preparing step S110 includes a substrate manufacturing step S111 and an exterior molding step S112.

Referring to FIG. 3(a), in the substrate manufacturing step S111, a substrate 110 for performing the function of a mold when the exterior 120 is molded is manufactured. A pattern of a shape corresponding to a printed pattern to be formed on the external surface of the exterior 120 is patterned on one surface of the substrate 110 so that a required printed pattern is formed in the exterior 120 described later using the substrate 110 as a mold.

The pattern formed on the substrate 110 may be formed by one of nano lithography and imprinting, however, is not limited to the above.

The exterior molding step S112 includes a mixture preparing step S113, a filling step S114, a hardening step S115, and a mold releasing step S116.

Referring to FIG. 3(b), in the mixture preparing step S113, ferromagnetic particles 123 are mixed with a liquid polymer resin 122 to prepare a mixture 121.

Nano or micro particles such as nickel (Ni), cobalt (Co), and steel (Fe) may be used as the ferromagnetic particles 123 used in the present exemplary embodiment. In addition, in the present exemplary embodiment, polydimethylsiloxane (PDMS) or polytetrafluroethylene (PTFE) may be used as the polymer resin 122. Any polymer resin having flexibility after being hardened may be used as the polymer resin 122 without being limited to the above.

In addition, a ferromagnetic additive may be further included in the mixture 121 so that characteristics such as strength, electric conductivtiy, and thermal conductivity are improved.

Carbon nanotube (CNT), carbon fiber, glass fiber, or a mixture of at least two of carbon nanotube (CNT), carbon fiber, and glass fiber may be used as the ferromagnetic additive. Any additive that may help improve the characteristics of the mixture after being hardened may be used without being limited to the above.

Referring to FIG. 3(c), in the filling step S114, the liquid mixture 121 is filled in the substrate 110 that functions as a mold. At this time, the viscosity of the liquid mixture 121 is controlled so that the mixture 121 may be precisely filled in the pattern formed on the substrate 110.

The pattern of the substrate 110 is formed before filling the mixture 121 and the surface in which the mixture 121 is filled is coated with a mold release so that the exterior 120 may be easily released from the substrate 110 later.

On the other hand, in the present exemplary embodiment, the mixture 121 is liquid, however, may be powdered or semisolid in accordance with a molding conditions and the kind of material to be filled in the substrate 110. Such a modification will be described later.

Figure 4:
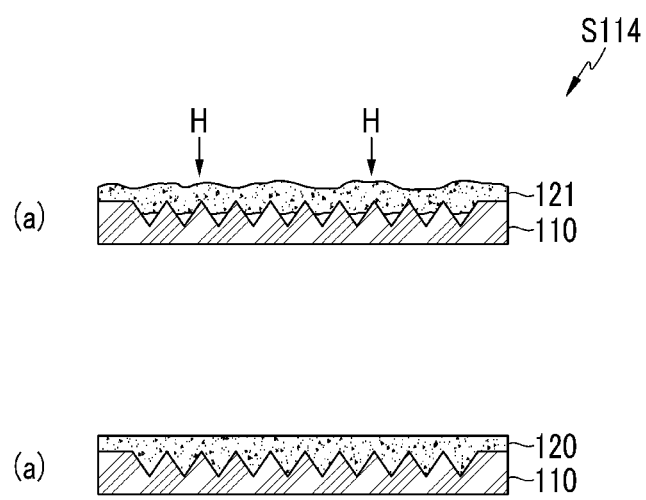
Figure 5:
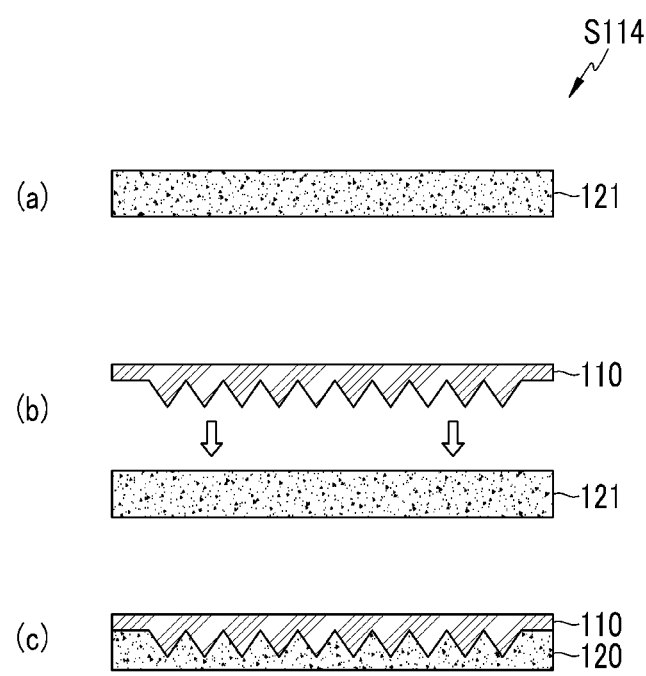

FIGS. 4 and 5 schematically illustrate modifications of the filling step of FIG. 2.

In the filling step S114 of the present exemplary embodiment, the liquid mixture 121 is filled in the substrate. However, referring to FIG. 4, in the filling step S114 of the modification, the powdered mixture 121 is filled in the substrate, is heated H, and is dissolved so that the mixture 121 may permeate into the pattern of the substrate. In addition, referring to FIG. 5, in the filling step S114 of another modification, the liquid mixture 121 may be made semisolid to be pressed by the substrate 110.

In the hardening step S115, the liquid mixture 121 is hardened to form the exterior 120.

In the mold releasing step S116, the exterior 120 is released from the substrate 110 so that the manufacturing of the exterior 120 is finally completed.

In an exterior attaching step S120, the molded exterior 120 is attached to the external circumferential surface of a central roll 130. The central roll 130 as ferromagnetic material such as a permanent magnet is a cylinder with a predetermined diameter so that the exterior 120 may be attached to the external surface of the central roll 130 by magnetic power.

When the opposite surface of the surface in which the printed pattern of the molded exterior 120 is formed contacts the external circumferential surface of the central roll 130, the exterior 120 is combined with the central roll 130 by attractive force between the ferromagnetic particles included in the exterior 120 and the central roll 130 formed of the permanent magnet.

In a conventional art, a roll of metal material is directly processed to manufacture a roll for roll printing/roll imprinting. However, according to the present exemplary embodiment, since the additional exterior 120 is processed and molded on a plane to be combined with the external circumferential surface of the central roll 130 of the magnetic material, processes may be simplified and cost may be reduced.

In addition, in a roll 100 for roll printing/roll imprinting manufactured by the present exemplary embodiment, since only the exterior 120 may be detachably replaced without replacing the entire roll like in the conventional art, it is possible to conveniently and cheaply maintain and repair the roll 100 for roll printing/roll imprinting.

Next, a method of manufacturing a roll for roll printing/roll imprinting according to a second exemplary embodiment of the present invention will be described.

FIG. 2 is a process flowchart of the roll printing/roll imprinting roll manufacturing method S100 according to the first exemplary embodiment of the present invention and a process flowchart of the roll printing/roll imprinting roll manufacturing method S200 according to the second exemplary embodiment.

Referring to FIG. 2, the roll printing/roll imprinting roll manufacturing method S200 according to the second exemplary embodiment of the present invention includes an exterior preparing step S210 and an exterior attaching step S220.

The exterior preparing step S210 includes a substrate manufacturing step S211 and an exterior molding step S212 like in the first exemplary embodiment. However, since the substrate manufacturing step S211 is the same as the substrate manufacturing step of the first exemplary embodiment, description thereof will be omitted.

Figure 6:
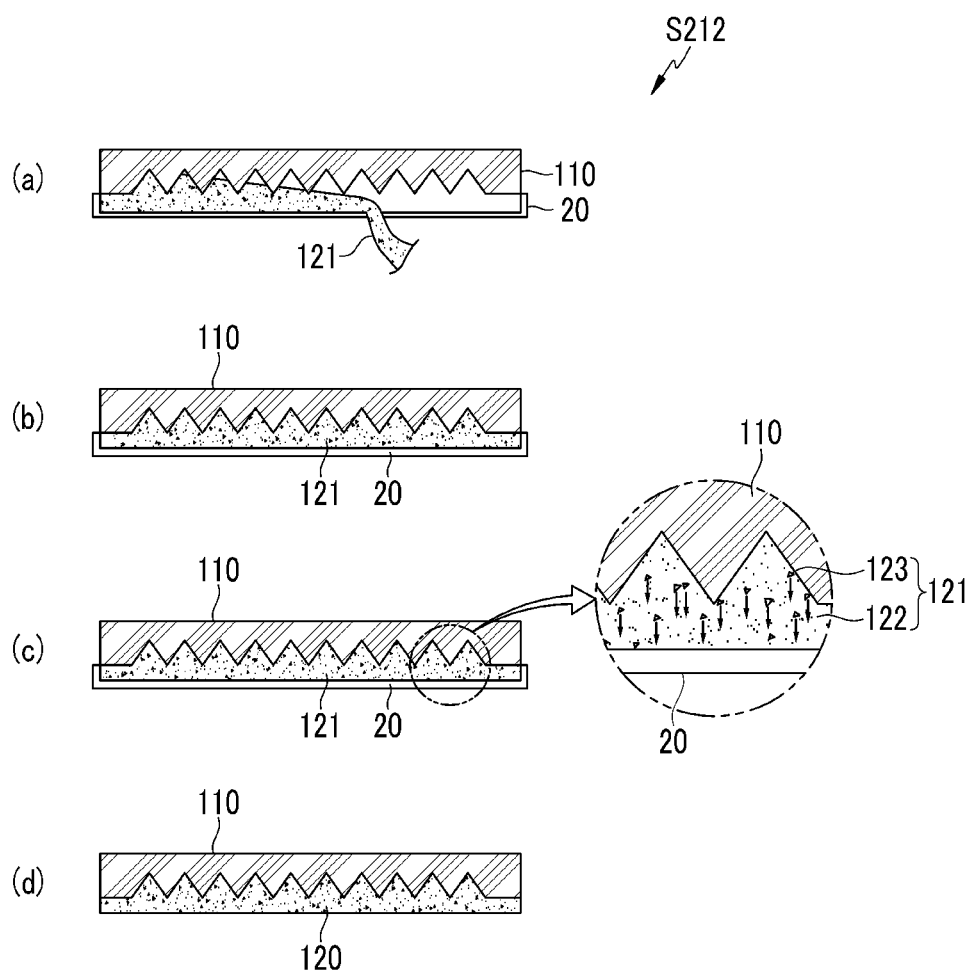

FIG. 6 schematically illustrates the exterior molding step S212 in the roll printing/roll imprinting roll manufacturing method S200 according to the second exemplary embodiment of the present invention.

Referring to FIG. 6, the exterior molding step S212 includes a mixture preparing step S213, a filling step S214, a hardening step S215, and a mold releasing step S216.

In the mixture preparing step S213, the ferromagnetic particles 123, the polymer resin 122, and the additive are mixed by the same method as the method of the first exemplary embodiment to prepare the liquid mixture 121.

Referring to FIG. 6(a), in the filling step S214, the prepared mixture 121 is filled in the substrate. Unlike in the first exemplary embodiment, the substrate 110 is disposed so that the formed pattern faces a gravitation direction and an additional mold 20 is prepared under the substrate to support the filled mixture 121 under the filled mixture 121 so that the filled mixture 121 does not leak.

Referring to FIGS. 6(b) and 6(c), in the hardening step S215, hardening conditions such as time, temperature, and pressure are controlled so that the ferromagnetic particles 123 included in the filled mixture 121 are moved in the gravitation direction by self-gravitation to manufacture the exterior 120.

Therefore, referring to FIG. 6(d), in the exterior 120 formed in the hardening step S215 of the present exemplary embodiment, the density of the ferromagnetic particles 123 on the opposite side is measured to be higher than the density of the ferromagnetic particles 123 on the side where the printed pattern is formed.

In the mold releasing step S216, the manufactured exterior 120 is released from the substrate 110.

Therefore, according to the present exemplary embodiment, since the density of the ferromagnetic particles 123 is large in the position close to the central roll 130 of the exterior 120, in the exterior attaching step S220, although only a small amount of ferromagnetic particles 123 are mixed with the exterior 120, the exterior 120 and the central roll 130 may have excellent binding power. In addition, the printed pattern is formed in the surface of the exterior 120 where the ferromagnetic particles 123 are not dense so that a minute nano/micro printed pattern may be formed.

Next, a method of manufacturing a roll for roll printing/roll imprinting according to a third exemplary embodiment of the present invention will be described.

FIG. 2 is a flowchart of the roll printing/roll imprinting roll manufacturing method S100 according to the first exemplary embodiment of the present invention and is a flowchart of the roll printing/roll imprinting roll manufacturing method S300 according to the third exemplary embodiment.

Referring to FIG. 2, the roll printing/roll imprinting roll manufacturing method S300 according to the third exemplary embodiment of the present invention includes an exterior preparing step S310 and an exterior attaching step S320.

The exterior preparing step S310 includes a substrate manufacturing step S311 and an exterior molding step S312 like in the first exemplary embodiment. However, since the substrate manufacturing step S311 is the same as the substrate manufacturing step according to the first exemplary embodiment, description thereof will be omitted.

Figure 7:
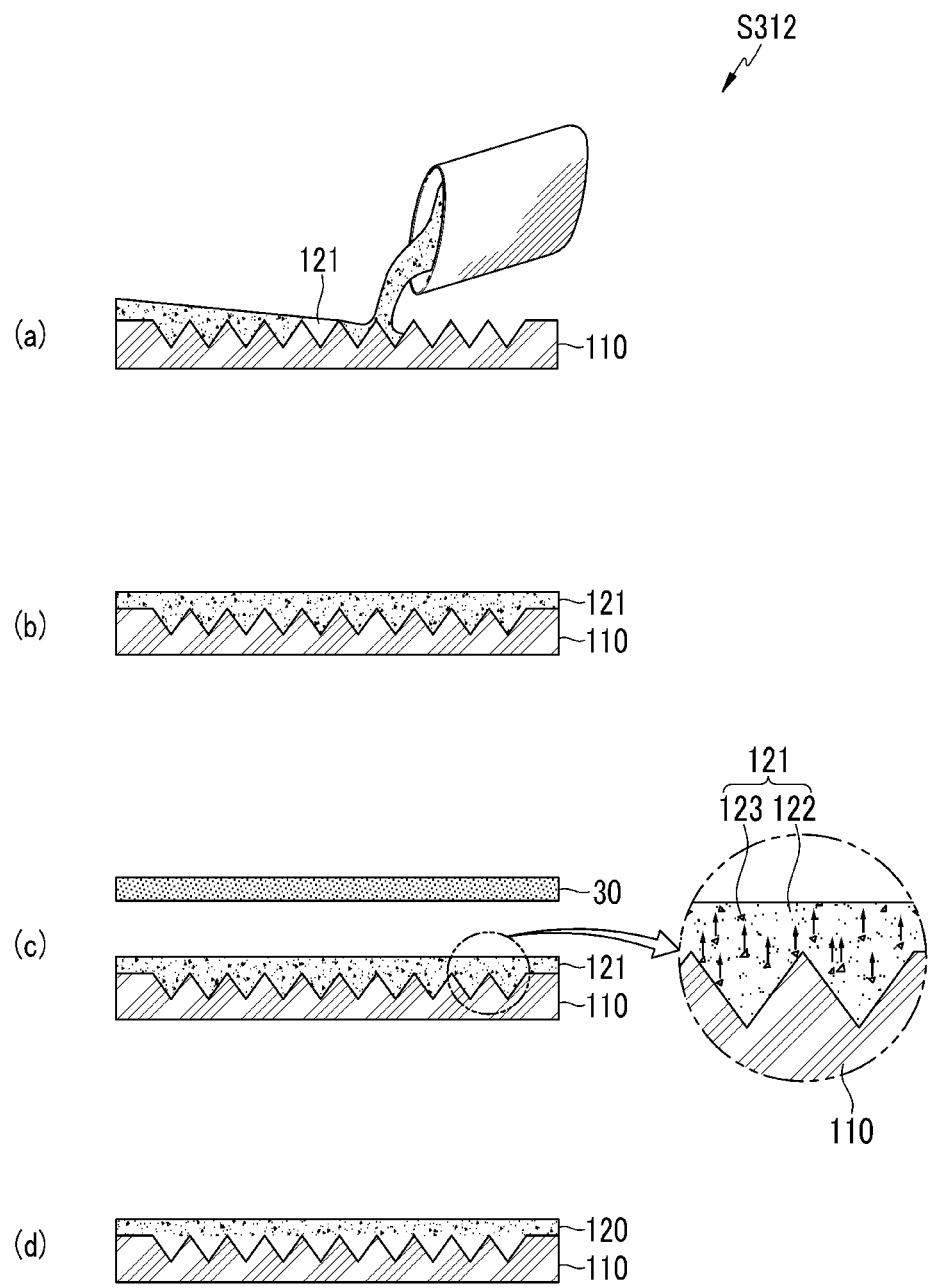

FIG. 7 schematically illustrates the exterior molding step S312 in the roll printing/roll imprinting roll manufacturing method S300 according to the third exemplary embodiment of the present invention.

Referring to FIG. 7, the exterior molding step S312 includes a mixture preparing step S313, a filling step S314, a hardening step S315, and a mold releasing step S316.

In the mixture preparing step S313, the ferromagnetic particles 123, the polymer resin 122, and the additive are mixed by the same method as the method of the first exemplary embodiment to prepare the liquid mixture 121.

Referring to FIG. 7(a), in the filling step S314, the mixture 121 is filled in the substrate 110 by the same method as the method of the first exemplary embodiment.

Referring to FIGS. 7(b) to 7(d), in the hardening step S315, the ferromagnetic particles 123 included in the filled mixture 121 are controlled to be moved to the opposite side to the side on which the printed pattern is formed. Unlike in the method of using self-gravitation of the second exemplary embodiment, in the present exemplary embodiment, an additional magnetic power member 30 is disposed on the opposite side to the side on which the printed pattern of the mixture 121 is formed so that the ferromagnetic particles 123 are moved by magnetic power.

At this time, the magnetic power member 30 may be disposed to be closely adjacent to the mixture 121 or to be separated from the mixture 121 by a predetermined distance. The distance by which the magnetic power member 30 is separated from the mixture 121 and magnetic power may be determined in accordance with the hardening time of the mixture 121, the travel range of the ferromagnetic particles 123, and the density distribution of the required ferromagnetic particles 123.

Therefore, referring to FIG. 7, in the exterior 120 formed in the hardening step S315 of the present exemplary embodiment, the density of the ferromagnetic particles 123 on the opposite side is measured to be higher than the density of the ferromagnetic particles 123 on the side where the printed pattern is formed.

In the mold releasing step S316, the manufactured exterior 120 is released from the substrate 110 and the exterior 120 is formed.

Therefore, according to the present exemplary embodiment, since the density of the ferromagnetic particles 123 is large in the position close to the central roll 130 of the exterior 120, in the exterior attaching step S320, although only a small amount of ferromagnetic particles 123 are mixed with the exterior 120, the exterior 120 and the central roll 130 may have excellent binding power. In addition, the printed pattern is formed in the surface of the exterior 120 on the side where the ferromagnetic particles 123 are not dense so that so that a minute nano/micro printed pattern may be formed.

The scope of the present invention is not limited to the above-described embodiments but may be realized by various exemplary embodiments within the range of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a roll for roll imprinting, comprising:

preparing an exterior on one surface of which a printed pattern of a predetermined shape is formed and that has magnetic power; and having an other surface of the exterior contact an external surface of a central roll so that the exterior is attached to the central roll having magnetic power by magnetic power, wherein preparing the exterior comprises manufacturing a plane substrate in which a mirror-shaped pattern of the printed pattern is formed, and molding the exterior using the plane substrate as a mold, and molding the exterior comprises preparing a mixture including ferromagnetic particles and polymer resin, filling the mixture in the plane substrate, hardening the mixture to form the exterior, and releasing the exterior from the plane substrate.

2. The method of claim 1, wherein, in hardening the mixture, the mixture is hardened so that the ferromagnetic particles are moved to an opposite surface to the surface on which the pattern is formed.

3. The method of claim 2, wherein the mixture is disposed so that the ferromagnetic particles are moved to the direction of terrestrial gravitation by self-gravitation.

4. The method of claim 2, wherein a magnetic power member is disposed on an opposite side to a side on which the pattern of the mixture is formed so that the ferromagnetic particles are moved by magnetic power.

5. The method of any one of claim 2 to claim 4, wherein the polymer resin is a flexible material.

6. The method of claim 5, wherein the polymer resin is at least one of polydimethylsiloxane (PDMS) and polytetrafluroethylene (PTFE).

7. The method of claim 1, wherein, after hardening the mixture, a ferromagnetic additive is further included in the mixture.

8. The method of claim 7, wherein the ferromagnetic additive is at least one of carbon nanotube, carbon fiber, and glass fiber.

* * * * *